(12) United States Patent
Han (10) Patent No.: US 9,616,508 B2
(45) Date of Patent: Apr. 11, 2017

(54) PIPE CUTTING KNIFE

(71) Applicant: Ningbo Ant Tools Co., Ltd., Ningbo (CN)

(72) Inventor: Guangming Han, Ningbo (CN)

(73) Assignee: Ningbo Ant Tools Co., Ltd. (CN)

( * ) Notice: Subject to any disclaimer, the term of this patent is extended or adjusted under 35 U.S.C. 154(b) by 91 days.

(21) Appl. No.: 14/504,138

(22) Filed: Oct. 1, 2014

(65) Prior Publication Data
US 2016/0059327 A1 Mar. 3, 2016

(30) Foreign Application Priority Data
Aug. 26, 2014 (CN) .................... 2014 2 0484510 U (51) Int. Cl.
*B23D 21/06* (2006.01)
(52) U.S. Cl.
CPC .................. *B23D 21/06* (2013.01)
(58) Field of Classification Search
CPC ...................................... B23D 21/06
USPC ......................... 30/190, 250, 240
See application file for complete search history.

(56) References Cited

U.S. PATENT DOCUMENTS

| | | | | |
|---|---|---|---|---|
| 1,174,267 A * | 3/1916 | Hultman | ........... | B25F 1/006 140/121 |
| 2,927,373 A * | 3/1960 | Taube | ........... | A01G 3/037 30/247 |
| 3,243,880 A * | 4/1966 | Weller | ........... | A01G 3/02 30/189 |
| 4,094,064 A * | 6/1978 | Nishikawa | ........... | B26B 13/26 30/192 |
| 4,368,577 A * | 1/1983 | Babb | ........... | B26B 13/26 30/251 |
| 4,674,184 A * | 6/1987 | Anderson | ........... | B26D 3/169 30/251 |
| 5,122,092 A * | 6/1992 | Abdul | ........... | A22B 5/163 30/219 |

(Continued)

*Primary Examiner* — Sean Michalski
(74) *Attorney, Agent, or Firm* — Tarolli, Sundheim, Covell & Tummino LLP (57) ABSTRACT

The present patent application discloses a pipe cutter, comprises a left housing, a right housing, a blade, small handle, a rotary shaft and a reset mechanism; the left housing and the right housing are fixed together; the blade is rotatable located between the left housing and the right housing; the rotary shaft pass through the left housing and the blade and is fixed with the right housing; the small handle is provided with a blade feeding apparatus and a blade locking apparatus, the blade feeding apparatus is used for controlling the rotation of the blade, the blade locking apparatus is used for fixing the position of the blade; the small handle is mounted on one side of the left housing and the right housing, the small handle is hinged with the left housing and the right housing through blade locking apparatus; the blade is provided with tooth grooves and hook portion, the hook portion is mounted on the left side of the tooth grooves and adjacent to the tooth grooves 8. By cooperation of the using of the blade feeding apparatus and the blade locking apparatus, the operator can cut the plastic pipe with less effort. Meanwhile, the blade locking apparatus ensures the blade will not rebound and improves the effectiveness of pipe cutting. The blade replacement is also convenient.

11 Claims, 7 Drawing Sheets

(56) References Cited

U.S. PATENT DOCUMENTS

| | | | | |
|---|---|---|---|---|
| 5,129,158 A * | 7/1992 | Campagna | B26D 3/169 30/243 |
| 5,198,789 A * | 3/1993 | Taylor | H01H 50/541 335/132 |
| 5,331,742 A * | 7/1994 | Schmode | H02G 1/005 30/245 |
| 5,642,566 A * | 7/1997 | Hirabayashi | H02G 1/005 30/228 |
| 5,718,051 A * | 2/1998 | Huang | B23D 21/10 30/250 |
| 5,758,729 A * | 6/1998 | Undin | B25B 7/00 173/11 |
| 5,826,341 A * | 10/1998 | Massa | A01G 3/08 30/247 |
| 5,829,142 A * | 11/1998 | Rieser | B23D 21/08 30/93 |
| 5,862,593 A * | 1/1999 | Huang | B26D 3/169 30/182 |
| 5,987,754 A * | 11/1999 | Hirabayashi | B26B 15/00 30/228 |
| 6,098,291 A * | 8/2000 | Wang | B23D 21/06 30/190 |
| 6,154,966 A * | 12/2000 | Kobayashi | H02G 1/005 30/250 |
| 6,305,087 B1 * | 10/2001 | Huang | B23D 21/10 30/188 |
| 6,467,172 B1 * | 10/2002 | Jenq | B26D 3/169 30/243 |
| 6,658,739 B1 * | 12/2003 | Huang | B23D 21/08 30/101 |
| 7,127,819 B1 * | 10/2006 | Huang | B23D 21/06 30/251 |
| 8,024,864 B2 * | 9/2011 | Mortensen | B26B 17/02 30/188 |
| 8,166,659 B2 * | 5/2012 | Huang | B26B 13/26 30/190 |
| 8,656,597 B2 * | 2/2014 | Pellenc | A01G 3/037 30/194 |
| 8,683,704 B2 * | 4/2014 | Scott | A01G 3/037 30/228 |
| 2005/0150113 A1 * | 7/2005 | Shultis | B23D 21/04 30/101 |
| 2008/0307657 A1 * | 12/2008 | Macsay | B23D 21/06 30/250 |
| 2010/0018059 A1 * | 1/2010 | Huang | B26D 3/169 30/92 |
| 2010/0077621 A1 * | 4/2010 | Quigley | A01G 3/033 30/228 |
| 2010/0325894 A1 * | 12/2010 | Scott | B23D 21/00 30/92 |
| 2011/0061242 A1 * | 3/2011 | Chen | A01G 3/037 30/228 |
| 2013/0000130 A1 * | 1/2013 | Maniwa | B26B 15/00 30/228 |
| 2013/0055574 A1 * | 3/2013 | Nie | B26B 15/00 30/228 |
| 2013/0055575 A1 * | 3/2013 | Delmas | B26B 15/00 30/228 |
| 2013/0097873 A1 * | 4/2013 | Luo | B23D 21/00 30/92 |
| 2015/0340849 A1 * | 11/2015 | Kochi | H02G 1/005 30/251 |

\* cited by examiner

PIPE CUTTING KNIFE

TECHNICAL FIELD

The patent application relates to mechanical tools, and particularly to a pipe cutter.

BACKGROUND

In industrial and agricultural production, the aluminum pipe or plastic pipe have a wide range of uses. In the installation of the pipes, the pipe must be cut for the installation and connection.

When cutting the pipes using conventional pipe cutter, the blade of the pipe cutter frequently shift due to the elastic force of some of the plastic pipe itself. It's difficult for the operator to cut the pipe quickly and efficiently. This may impact the cutting efficiency and reduce the work efficiency.

Meanwhile, the using of the existing pipe cutter needs a great effort. The cutting pipe operators need to spend a lot of effort to cut off the pipe for cutting the plastic pipe with a thick wall.

SUMMARY

The present patent application provides a pipe cutter to overcome the above deficiency of low working efficiency and strenuous cutting.

In order to solve the above technical problems, the patent application provides a pipe cutter. The pipe cutter includes a left housing, a right housing, a blade, a handle, a rotary shaft and a reset mechanism configured to reset the blade. The left housing and the right housing are fixed together. The blade is rotatable located between the left housing and the right housing. The blade is provided with a plurality of tooth grooves and a hook portion. The reset mechanism is located in the right housing. The reset mechanism extends along with a rotation of blade. When the blade retracts, the blade reset under the effect of the reset mechanism.

In one embodiment, the reset mechanism includes a tension spring. One end of the tension spring is fixed to the right housing, and another end of the tension spring hooks the hook portion of the blade.

In one embodiment, the reset mechanism includes a tension spring and a pulley. The tension spring is attached to a groove of the pulley. One end of the tension spring is fixed to the right housing, and another end of the tension spring hooks the hook portion of the blade. The right housing is provided with a rail for a movement of the tension spring, the pulley is mounted on a corner of the rail.

In one embodiment, the blade includes a cutter edge portion, a through hole and a circular arc portion. The circular arc portion is located at one side of the tooth grooves and adjacent to the tooth grooves. The through hole is located at the center of the blade. The through hole coordinates with the rotary shaft. The cutter edge portion is positioned below the circular arc portion. One end of the cutter edge portion is adjacent to the circular arc portion. Another end of the cutter edge portion is adjacent to the hook portion. The cutter edge portion includes an upper edge and a lower edge and a connecting corner which is located between the upper edge and the lower edge.

In one embodiment, the rotary shaft passes through the left housing and the blade and is fixed with the right housing. The handle is provided with a blade feeding apparatus and a blade locking apparatus. The blade feeding apparatus is used for controlling a rotation of the blade. The blade locking apparatus is used for fixing a position of the blade. The handle is mounted on one side of the left housing and the right housing, and the handle is hinged with the left housing and the right housing through the blade locking apparatus.

In one embodiment, the blade feeding apparatus includes a hinge pin, a pushing block and a first driving spring. The hinge pin is fixed to the handle. The pushing block is rotatably connected to the hinge pin. The first driving spring is located in the hinge pin. One end of the first driving spring abuts against the pushing block, and another end of the first driving spring abuts against the inside of the handle. It makes the first driving spring push the pushing block to contact with the tooth grooves of the blade.

In one embodiment, the blade locking apparatus includes a shaft, a locking block and a second driving spring which drives the locking block moving toward the tooth grooves. The shaft is mounted on the handle, and an upper and lower ends of the handle coordinate with the left housing and the right housing. The locking block is rotatably provided on the shaft. The second driving spring is located on the shaft. One end of the second driving spring abuts against the locking block and another end of the second driving spring abuts against the inside of the handle.

In one embodiment, the end of the handle is hinged with a tail buckle, the left housing and the right housing is provided with a small cylindrical interlocking with the tail buckle.

In one embodiment, the left housing is provided with a return spring, one end of the return spring is fixed on the left housing, another end of the return spring contact with an extension portion of the handle.

The structure of the pipe cutter of the present patent application is well optimized. The operator can cut the plastic pipe with less effort through using the blade feeding apparatus and the blade locking apparatus. Meanwhile, the blade locking apparatus ensures the blade will not rebound and improves the effectiveness of pipe cutting. The blade replacement is also convenient. The pulley provided by the present patent application makes the tension spring slide in the rail more smoothly and avoids stuck phenomenon and thus prolong the using life.

In the Figures, 1: left housing, 2: right housing, 3: blade, 4: handle, 5: screw, 6: tension spring, 7: cutter edge portion, 8: tooth grooves, 9: hook portion, 10: pulley, 11: rail, 12: blade feeding apparatus, 13: blade locking apparatus, 14: hinge pin, 15: pushing block, 16: first driving spring, 17: shaft, 18: locking block, 19: second driving spring, 20: small cylindrical, 21: through hole, 22: circular arc portion, 23: upper edge, 24: lower edge, 25: connecting corner, 26: tail buckle, 27: return spring.

DETAILED DESCRIPTION

The embodiments of the present patent application will be described in detailed as below with reference to the drawings and embodiments. The following embodiments are used to illustrate the patent application, but not intend to limit the scope of the patent application.

Figure 1:
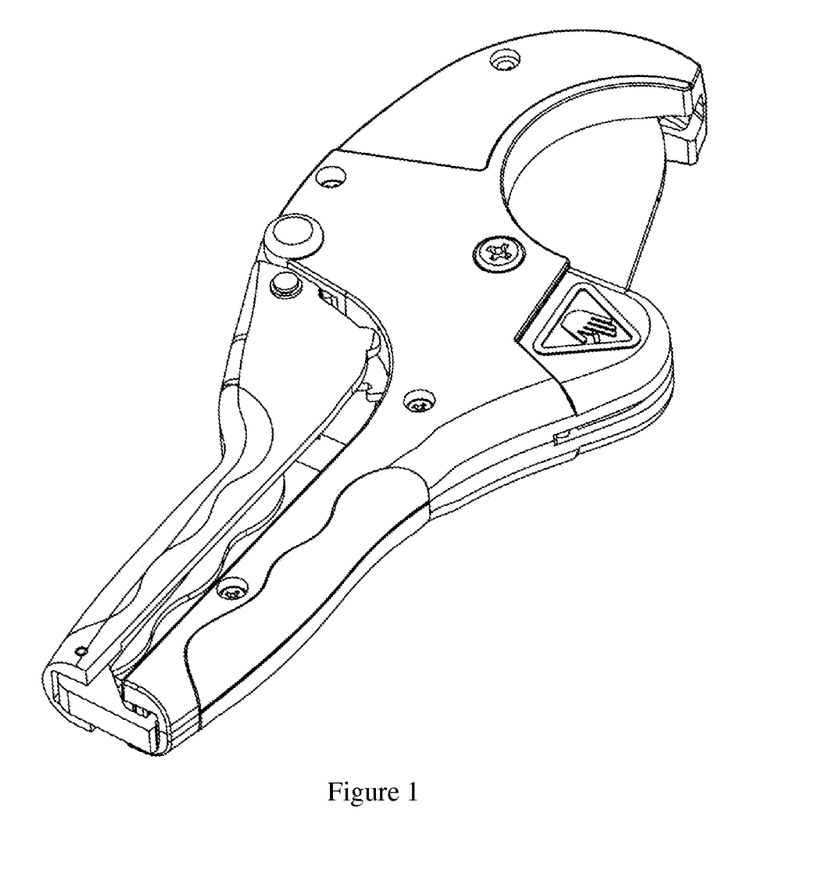
FIG. 1 illustrates a pipe cutter according an embodiment of the present patent application.
Figure 2:
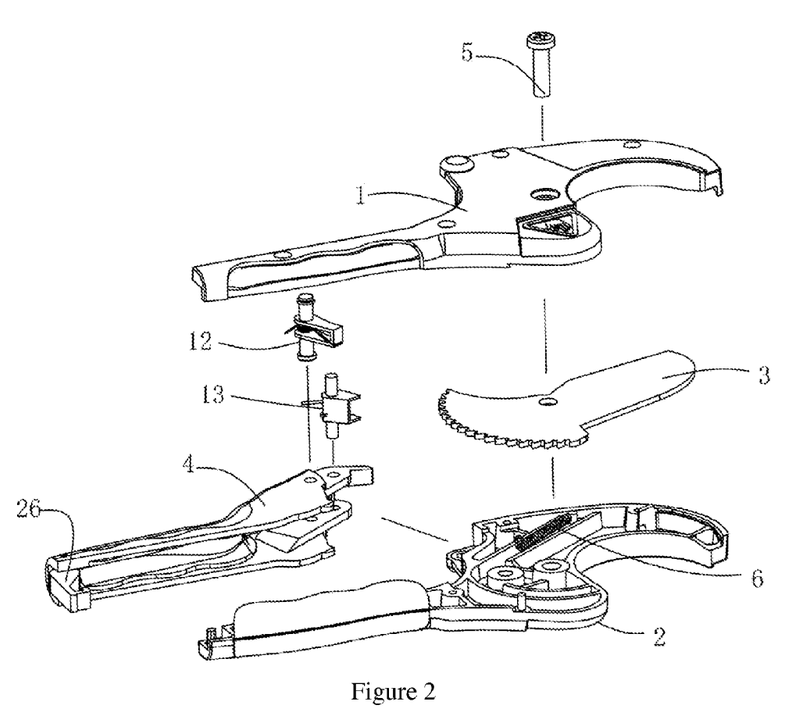
FIG. 2 is an exploded view of the pipe cutter according an embodiment of the present patent application.

Referring to FIG. 1 and FIG. 2, the pipe cutter of the present patent application includes a left housing 1, a right housing 2, a blade 3, a handle 4, a screw 5 and a reset mechanism. The left housing 1 and the right housing 2 are fixed together by the screw. The blade 3 is rotatable located between the left housing 1 and the right housing 2. The screw 5 passes through the left housing 1 and the blade 3 and is fixed with the right housing 2. The handle 4 is provided with a blade feeding apparatus 12 and a blade locking apparatus 13. The blade feeding apparatus 12 is used for controlling the rotation of the blade 3. The blade locking apparatus 13 is used for fixing the position of the blade 3. The handle 4 is mounted on one side of the left housing 1 and the right housing 2 and is hinged with the left housing 1 and the right housing 2 through the blade locking apparatus 13. The blade 3 is provided with a plurality of tooth grooves 8 and a hook portion 9. The hook portion 9 is mounted on the left side of the tooth grooves 8 and adjacent to the tooth grooves 8. The reset mechanism includes a tension spring and a pulley. The tension spring is attached to the groove of the pulley. One end of the tension spring 6 is a round hole which is fixed to the right housing 2. The other end of the tension spring is a hook which hooks the hook portion 9 of the blade 3. When both the blade feeding apparatus 12 and the blade locking apparatus 13 breakaway from the tooth grooves 8, the blade 3 reset under the effect of the tension spring 6. The right housing 2 is provided with a rail 11 for the movement of the tension spring 6. The pulley 10 is mounted at the corner of the rail 11, which is mounted on the right housing 2. The tooth grooves 8 are mounted on the upper edge of the blade 3 in an arc configuration. The blade 3 is provided with the hook portion 9 which makes the hook end of the tension spring 6 connect the hook portion 9 of the blade 3 directly. The structure of blade 3 is simple. It is convenient to change the blade 3. The pulley 10 is mounted on the corner of the rail 11 of the tension spring 6. The tension spring 6 slides in the rail 11 smoothly and avoids stuck phenomenon. The hook portion 9 is in a shape of L. The blade 3 is substantially in a shape of T.

The rotary shaft may be a screw or pin, etc. The present embodiment uses a screw 5 for the rotary shaft. The installation is more convenient.

In addition, the reset mechanism may be a separate tension spring 6.

Figure 3:
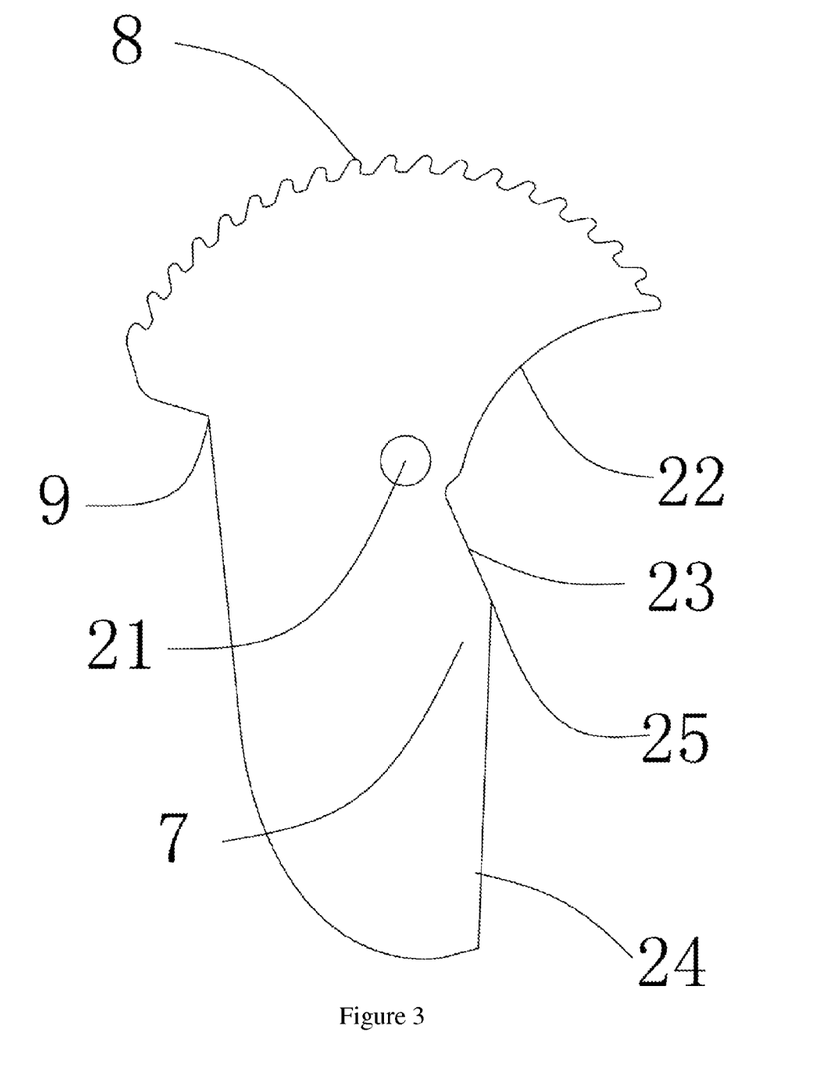
FIG. 3 illustrates a blade of the pipe cutter of the present patent application.

Referring to FIG. 3, the blade 3 includes a cutter edge portion 7, a through hole 21 and a circular arc portion 22. The circular arc portion 22 is located at the right side of the tooth grooves 8 and adjacent to the tooth grooves 8. The through hole 21 is positioned at the center of the blade 3 and coordinates with the screw 5. The cutter edge portion 7 is at the bottom of the circular arc portion 22. One end of the cutter edge portion 7 is adjacent to the circular arc portion 22. Another end of the cutter edge portion 7 is adjacent to the hook portion 9. The cutter edge portion 7 includes an upper edge 23, a lower edge 24 and a connecting corner 25 which is located between the upper edge 23 and the lower edge 24.

The curvature radius of the circular arc portion 22 is same as that of the pipe placement mouth of the pipe cutter, which ensures the stable placement of the pipe. The connecting corner 25 is located between the upper edge 23 and the lower edge 24, which benefits the cutting of the pipe. Comparing to the blade with a linear cutter edge, the blade of the present patent application ensures a bigger cut force. It saves effort.

Figure 5:
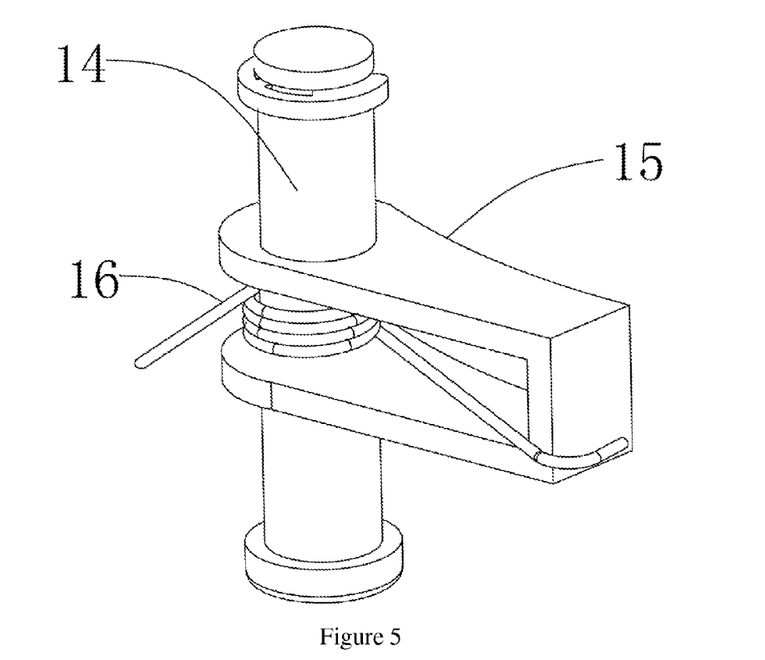
FIG. 5 illustrates a blade feeding apparatus of the pipe cutter of the present patent application.
Figure 7:
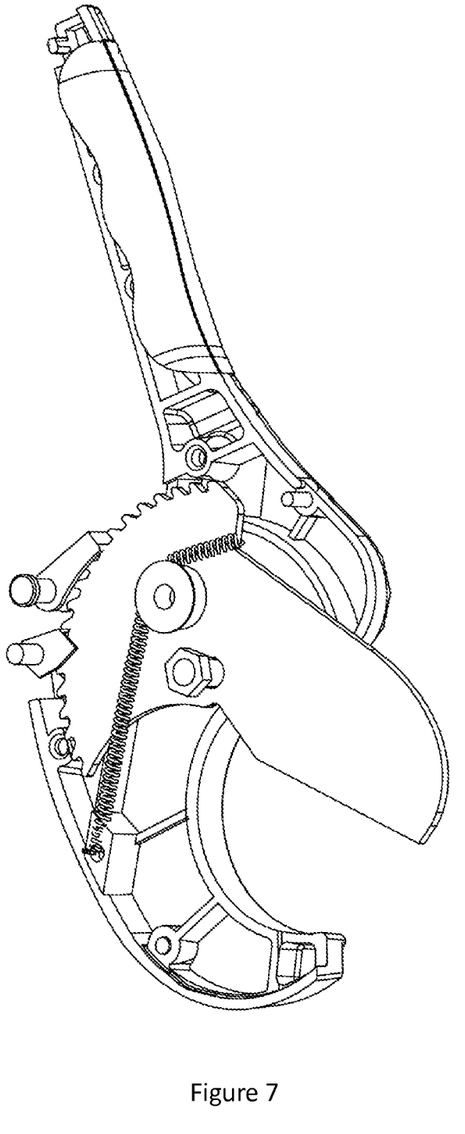
FIG. 7 illustrates an internal structure of the pipe cutter of the present patent application.

Referring to FIG. 5 and FIG. 7, the blade feeding apparatus 12 includes a hinge pin 14, a pushing block 15 and a first driving spring 16. The hinge pin 14 is fixed to the handle 4. The pushing block 15 is rotatably connected to the hinge pin 14. The first driving spring 16 is located in the hinge pin 14. One end of the first driving spring 16 is a hook which hooks the pushing block 15. Another end of the first driving spring 16 is in a shape of long stripe which abuts against an internal of the handle 4. It make the first driving spring 16 push the pushing block 15 to contact with the tooth grooves 8 of the blade 3. The first driving spring 16 pulls the pushing block 15 which makes the pushing block 15 moving toward the blade 3. When the pushing block 15 pushes the blade 3 rotating, one end of the pushing block 15 snaps in the tooth grooves 8.

Figure 6:
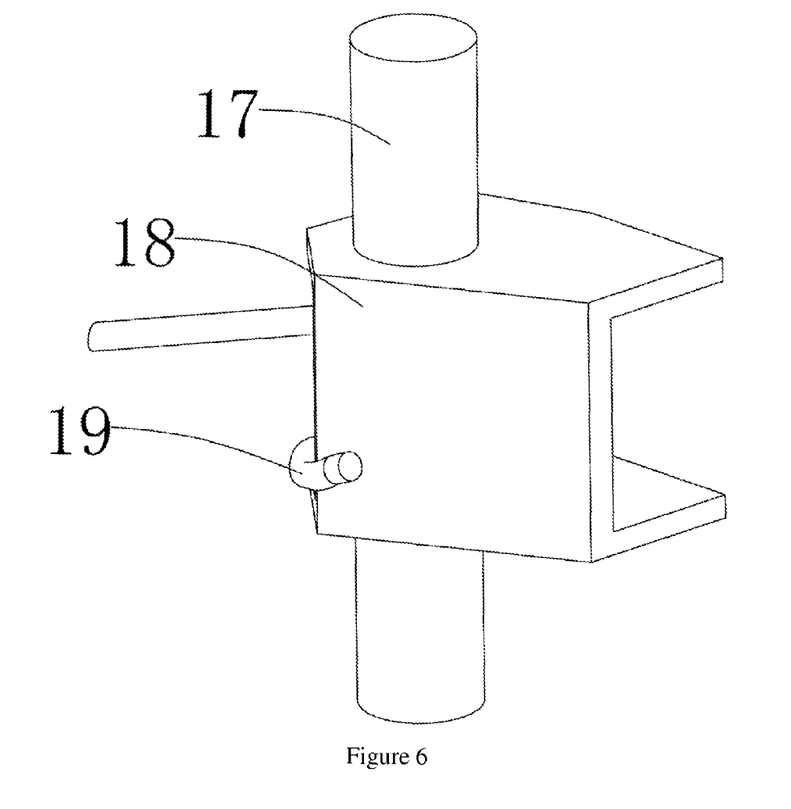
FIG. 6 illustrates a blade locking apparatus of the pipe cutter of the present patent application.

Referring to FIGS. 6 and 7, the blade locking apparatus 13 includes a shaft 17, a locking block 18 and a second driving spring 19 which drives the locking block 18 moving toward the tooth grooves 8. The shaft 17 is mounted on the handle 4. The upper and lower ends of the handle 4 coordinate with the left housing 1 and the right housing 2. The locking block 18 is rotatably provided on the shaft 17. The second driving spring 19 is located on the shaft 17. One end of the second driving spring 19 is a hook which hooks the locking block 18. Another end of the second driving spring 19 is in a shape of long stripe which abuts against an internal of the handle 4. The length of the locking block 18 is approximately a half of the length of the pushing block 15. The advantage of this structure is as below: The pushing block 15 and the locking block 18 may be mounted adjacently in a relative small space, meanwhile. The pushing block 15 and the locking block 18 can be properly mounted. After the pushing block 15 pushing the blade 3 to move forward a tooth, the locking block 18 snaps into another tooth groove 8 immediately. It avoids the blade 3 to reset under the pull force of the tension spring 6.

Figure 4:
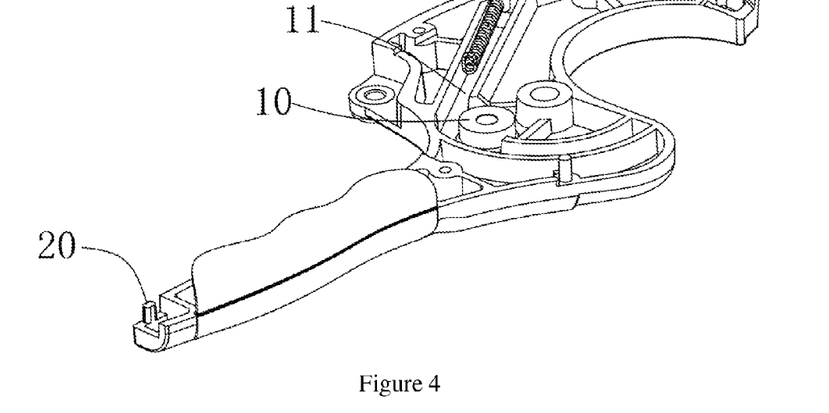
FIG. 4 illustrates a right housing of the pipe cutter of the present patent application.

Referring to FIGS. 2 and 4, the end of the handle 4 is hinged with a tail buckle 26. The left housing 1 and the right housing 2 is provided with a small cylindrical 20 which interlocks with the tail buckle 26. When the pipe cutter of the present patent application is not in use, the user can press the handle 4 to make it move toward the left housing 1 and the right housing 2. The tail buckle 26 clamps with the small cylindrical 20. The folding of the handle 4 can be completely as shown in FIG. 1.

Figure 8:
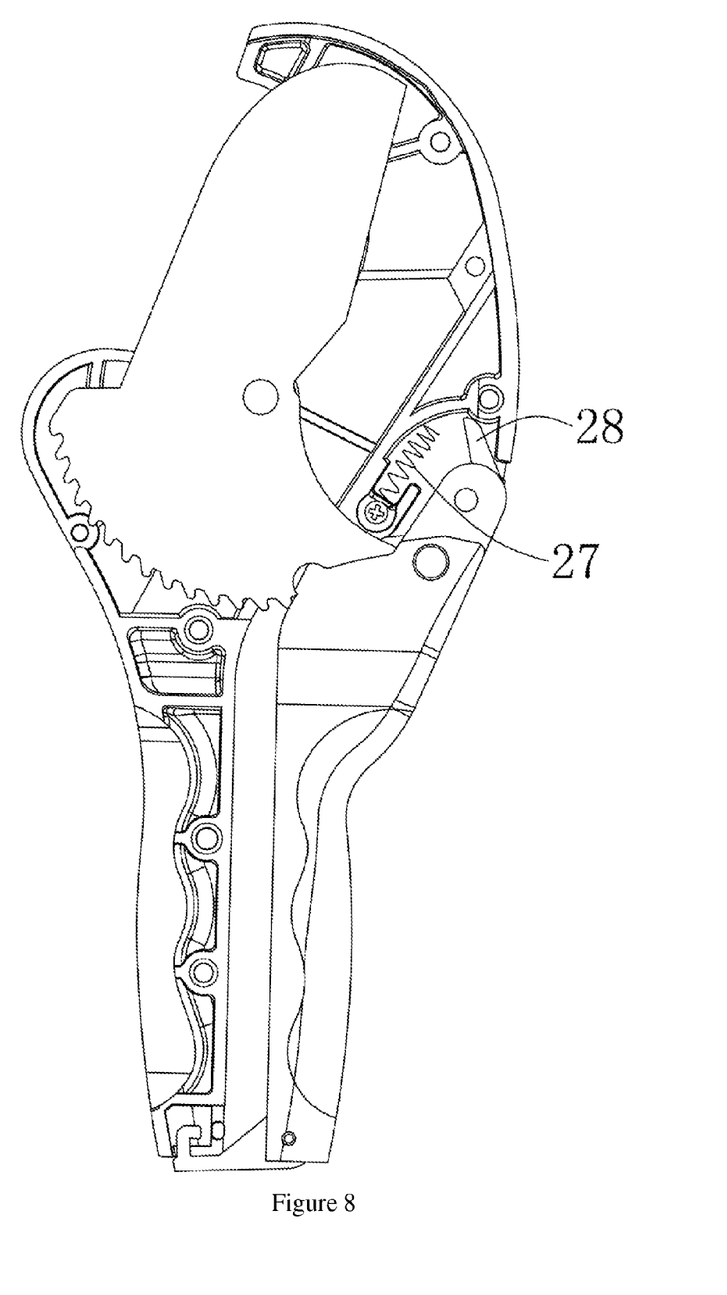
FIG. 8 illustrates another internal structure of the pipe cutter of the present patent application.

Referring to FIG. 8, the left housing 1 is provided with a return spring 27. One end of the return spring 27 is fixed on the left housing 1 through a screw. Another end of the return spring 2 contacts an extension portion 28 of the handle 4. The return spring 27 makes the handle 4 to reset fast.

The structure of the pipe cutter of the present patent application is well optimized. The operator can cut the plastic pipe with less effort through using the blade feeding apparatus and the blade locking apparatus. Meanwhile, the blade locking apparatus ensures the blade will not rebound and improves the effectiveness of pipe cutting. The blade replacement is also convenient. The pulley provided by the present patent application makes the tension spring slide in the rail more smoothly and avoids stuck phenomenon and thus prolong the using life.

The above embodiment does not intend to limit the scope of the claims. Numerous modifications and substitutions based on the substantial of the present patent application by a person skilled in the art fall within the scope of the present patent application.

The invention claimed is:

1. A pipe cutter, comprising:
a left housing;
a right housing comprising a rail;
a blade;
a handle;
a rotary shaft; and
a reset mechanism configured to reset the blade;
wherein the left housing and the right housing are fixed together; the blade is rotatable located between the left housing and the right housing;
wherein the blade is provided with a plurality of teeth grooves and a hook portion, the reset mechanism is located in the right housing; the reset mechanism extends along with a rotation of blade;
wherein the reset mechanism comprises a tension spring and a pulley, the tension spring is attached to a groove of the pulley, one end of the tension spring is fixed to the right housing, another end of the tension spring is a hook which hooks the hook portion of the blade; the tension spring slides in the rail, the pulley is mounted on a corner of the rail; and
wherein the blade comprises a cutter edge portion, a through hole and a circular arc portion; the circular arc portion is located at one side of the teeth grooves and adjacent to the teeth grooves; the through hole coordinates with the rotary shaft; the cutter edge portion is positioned below the circular arc portion, one end of the cutter edge portion is adjacent to the circular arc portion, another end of the cutter edge portion is adjacent to the hook portion; the cutter edge portion comprises an upper edge and a lower edge and a connecting corner which is located between the upper edge and the lower edge.

2. The pipe cutter of claim 1, wherein the rotary shaft passes through the left housing and the blade and is fixed with the right housing; the handle is provided with a blade feeding apparatus and a blade locking apparatus, the blade feeding apparatus is used for controlling a rotation of the blade, the blade locking apparatus is used for fixing a position of the blade; the handle is mounted on one side of the left housing and the right housing, and the handle is hinged with the left housing and the right housing through the blade locking apparatus.

3. The pipe cutter of claim 2, wherein the blade feeding apparatus comprises a hinge pin, a pushing block and a first driving spring; the hinge pin is fixed to the handle, the pushing block is rotatably connected to the hinge pin, the first driving spring is located in the hinge pin, one end of the first driving spring abuts against the pushing block, another end of the first driving spring abuts against the inside of the handle, which makes the first driving spring push the pushing block to contact with the teeth grooves of the blade.

4. The pipe cutter of claim 2, wherein the blade locking apparatus comprises a shaft, a locking block and a second driving spring which drives the locking block moving toward the teeth grooves; the shaft is mounted on the handle, and an upper and lower ends of the handle coordinate with the left housing and the right housing; the locking block is rotatably provided on the shaft; the second driving spring is located on the shaft; one end of the second driving spring abuts against the locking block, another end of the second driving spring abuts against the inside of the handle.

5. The pipe cutter of claim 2, wherein the left housing is provided with a return spring, one end of the return spring is fixed on the left housing, another end of the return spring contact with an extension portion of the handle.

6. A pipe cutter, comprising:
a left housing;
a right housing comprising a rail;
a blade;
a handle;
a rotary shaft; and
a reset mechanism configured to reset the blade;
wherein the left housing and the right housing are fixed together; the blade is rotatable located between the left housing and the right housing; and
wherein the blade is provided with a plurality of teeth grooves and a hook portion, the reset mechanism is located in the right housing; the reset mechanism extends along with a rotation of blade; and
wherein the reset mechanism comprises a tension spring and a pulley, the tension spring is attached to a groove of the pulley, one end of the tension spring is fixed to the right housing, another end of the tension spring is a hook which hooks the hook portion of the blade; the tension spring slides in the rail, the pulley is mounted on a corner of the rail.

7. The pipe cutter of claim 6, wherein the blade comprises a cutter edge portion, a through hole and a circular arc portion; the circular arc portion is located at one side of the teeth grooves and adjacent to the teeth grooves; the through hole coordinates with the rotary shaft; the cutter edge portion is positioned below the circular arc portion, one end of the cutter edge portion is adjacent to the circular arc portion, another end of the cutter edge portion is adjacent to the hook portion; the cutter edge portion comprises an upper edge and a lower edge and a connecting corner which is located between the upper edge and the lower edge.

8. The pipe cutter of claim 6, wherein the rotary shaft passes through the left housing and the blade and is fixed with the right housing; the handle is provided with a blade feeding apparatus and a blade locking apparatus, the blade feeding apparatus is used for controlling a rotation of the blade, the blade locking apparatus is used for fixing a position of the blade; the handle is mounted on one side of the left housing and the right housing, and the handle is hinged with the left housing and the right housing through the blade locking apparatus.

9. The pipe cutter of claim 8, wherein the blade feeding apparatus comprises a hinge pin, a pushing block and a first driving spring; the hinge pin is fixed to the handle, the pushing block is rotatably connected to the hinge pin, the first driving spring is located in the hinge pin, one end of the first driving spring abuts against the pushing block, another end of the first driving spring abuts against the inside of the handle, which makes the first driving spring push the pushing block to contact with the teeth grooves of the blade.

10. The pipe cutter of claim 8, wherein the blade locking apparatus comprises a shaft, a locking block and a second driving spring which drives the locking block moving toward the teeth grooves; the shaft is mounted on the handle, and an upper and lower ends of the handle coordinate with the left housing and the right housing; the locking block is rotatably provided on the shaft; the second driving spring is located on the shaft; one end of the second driving spring abuts against the locking block, another end of the second driving spring abuts against the inside of the handle.

11. The pipe cutter of claim 6, wherein the left housing is provided with a return spring, one end of the return spring is fixed on the left housing, another end of the return spring contact with an extension portion of the handle.

* * * * *